March 19, 1935.     L. E. LA BRIE     1,994,825
BRAKE
Filed June 14, 1928.     4 Sheets-Sheet 1
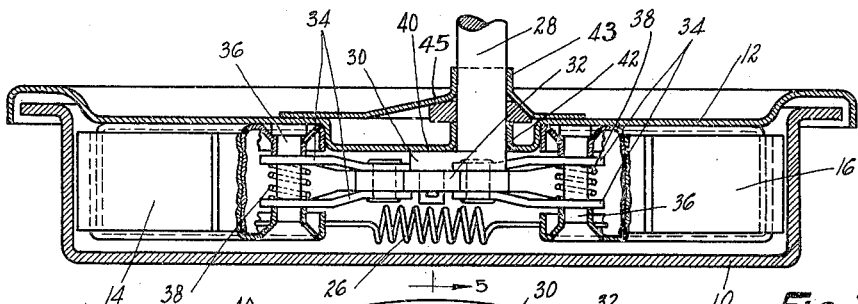
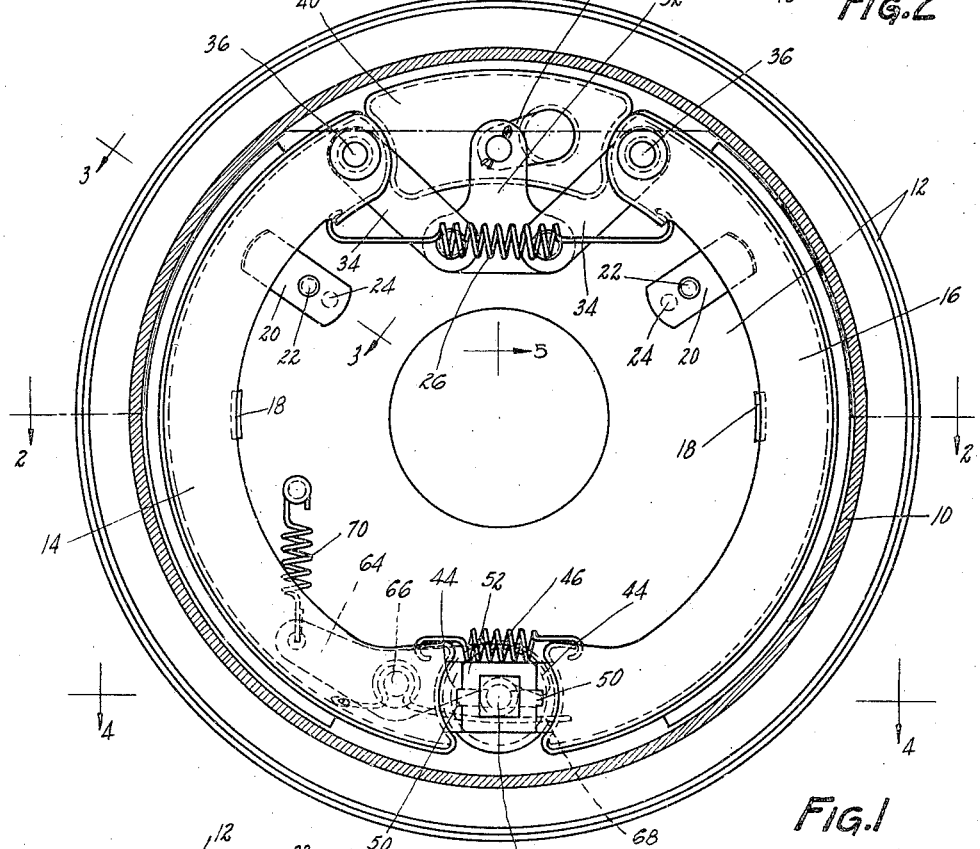
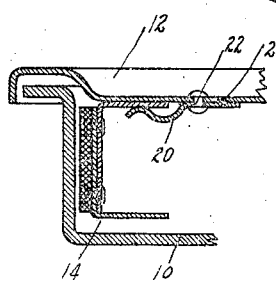
INVENTOR
LUDGER E. LA BRIE
BY
*Jn. W. McConkey*
ATTORNEY INVENTOR
LUDGER E. LA BRIE
BY
M.W. McConkey
ATTORNEY

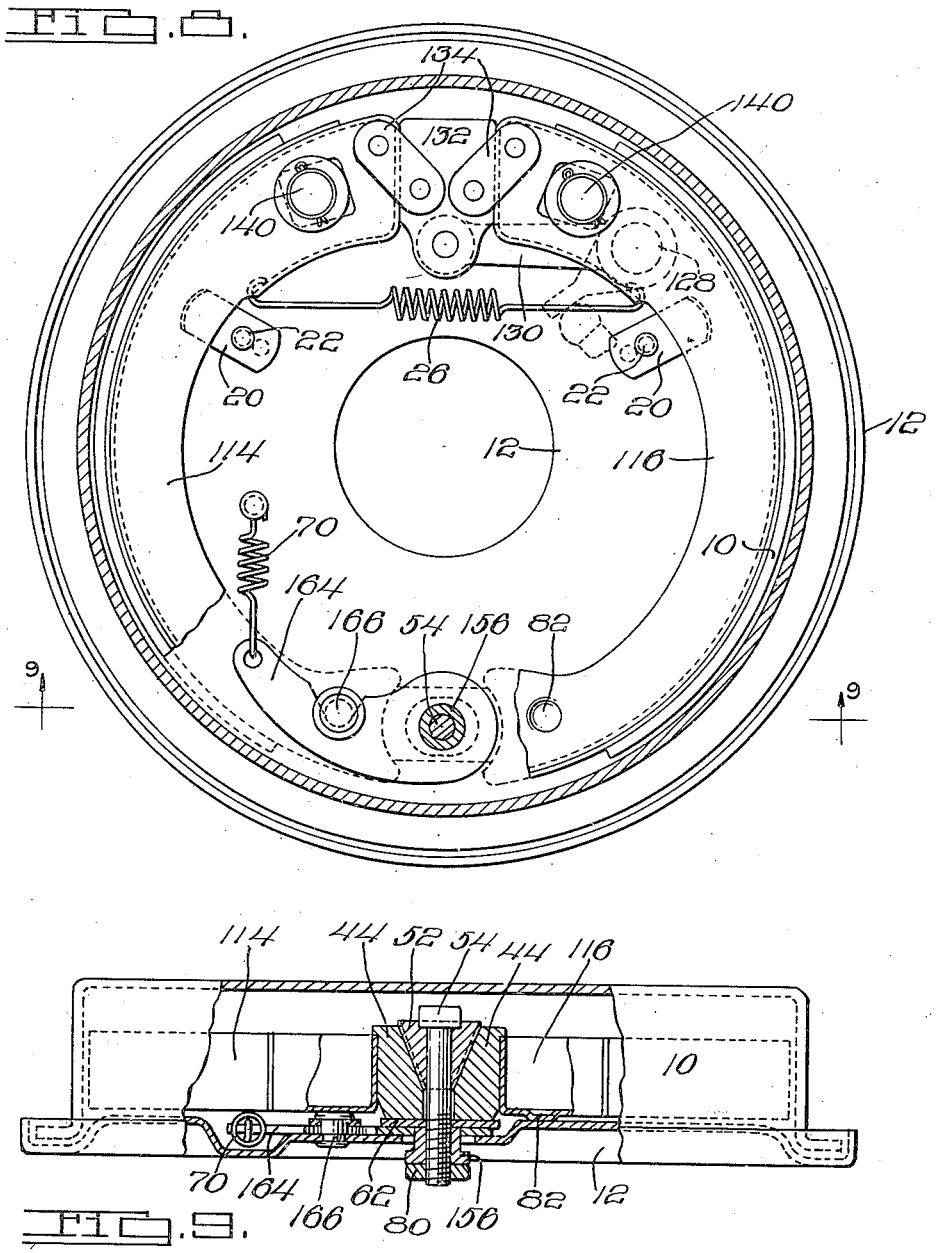

March 19, 1935.  L. E. LA BRIE  1,994,825

BRAKE

Filed June 14, 1928  4 Sheets-Sheet 4

INVENTOR
LUDGER E. LA BRIE

BY
*M. W. McConkey*
ATTORNEY

Patented Mar. 19, 1935

1,994,825

UNITED STATES PATENT OFFICE 1,994,825

BRAKE

Ludger E. La Brie, South Bend, Ind., assignor to Bendix Brake Company, South Bend, Ind., a corporation of Illinois Application June 14, 1928, Serial No. 285,289

15 Claims. (Cl. 188—78)

This invention relates to brakes, and is illustrated as embodied in several forms of internal expanding automobile brakes. Various features of novelty relate to forming the brake backing plate to take the braking torque directly, to a novel construction of applying device especially adapted for use with channel-shaped brake shoes, to an improved arrangement for holding the brake friction means under tension when the brake is released and which preferably also centers the friction means, to novel shoe constructions and improved wedge adjusting means, and to other novel and desirable constructions which will be apparent from the following description of the illustrative embodiments shown in the accompanying drawings, in which:

Figure 1 is a vertical section through one form of brake, just inside the head of the brake drum, showing the brake shoes in side elevation;

Figure 2 is a generally-horizontal section through this brake, on the line 2—2 of Figure 1;

Figure 3 is a partial radial section on the line 3—3 of Figure 1, showing one of the steady rests;

Figure 8 is a section corresponding to Figure 1, but showing a third brake;

Figure 9 is a bottom plan view of the brake of Figure 8, partly broken away on the line 9—9 of Figure 8;

Figures 11, 12:
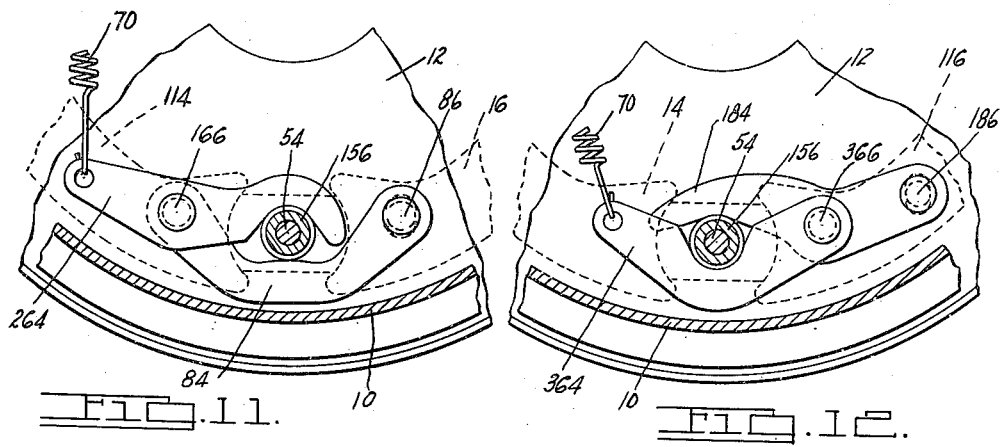
Figures 13, 14:
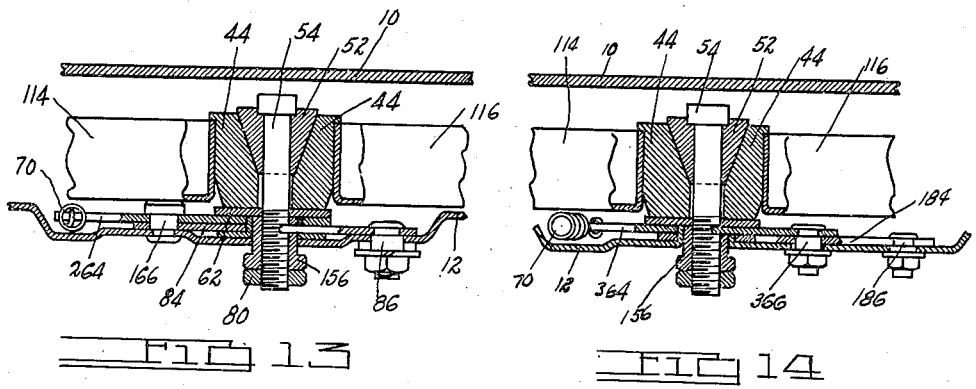

Figures 11 and 12 are both sections corresponding to the lower part of Figure 1, but showing different brakes; and Figures 13 and 14 are horizontal sections respectively through Figures 11 and 12.

The brake illustrated in Figures 1-5 includes a rotatable drum 10, at the open side of which is a support such as a backing plate 12, and within which is the friction means of the brake. The illustrated friction means includes two novel interchangeable stamped steel brake shoes 14 and 16, preferably channel-shaped and built up by nesting two angle-section stampings and securing them together by the lining rivets as shown in Figure 3. If desired, the sides may be held against spreading by a tie 18 connecting their free edges.

The shoes are yieldingly held by novel steady rests including leaf springs 20 secured to the backing plate by means such as rivets 22 and resiliently engaging the side flanges of the shoes on the side opposite the backing plate 12. Embossed projections 24 are shown seated in holes in the backing plate 12 to prevent the steady rests from turning.

The brake is applied by forcing shoes 14 and 16 apart, against the resistance of a return spring 26, by means such as an operating shaft 28 having an arm 30 provided with a novel pivoted tension link 32 at its end, the link being shown as generally triangular in form. The tension link 32 is pivotally connected to a toggle formed of two pairs of thrust links 34 mounted at their upper ends on transverse pivots 36 carried by the sides of the channel-shaped shoes. Coil springs 38 are shown sleeved on the pivots 36 between links 34. The sides of the shoes are drawn inwardly to form sleeves or bearings receiving the ends of pivots 36.

The ends of the shoes are formed with rounded flanges seated in thrust engagement with sockets in a novel anchor abutment 40 formed by integrally drawing or embossing the pressed steel backing plate 12 into the drum 10, during its process of manufacture. The anchor abutment is formed with one bearing 42 for the shaft 28, the other being provided by a sleeve 43 formed on a stamping 45 welded or otherwise secured to the outside of the backing plate over the depression formed by the anchor abutment 40.

Figures 4, 5:
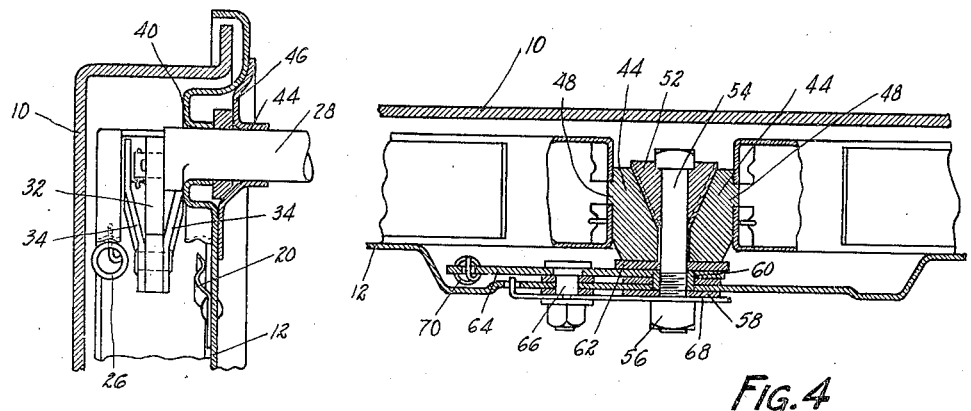
Figure 4 is a partial section through the adjustment of the brake, on the line 4—4 of Figure 1.
Figure 5 is a partial section through the applying means of the brake, on the line 5—5 of Figure 1.
Figure 6:
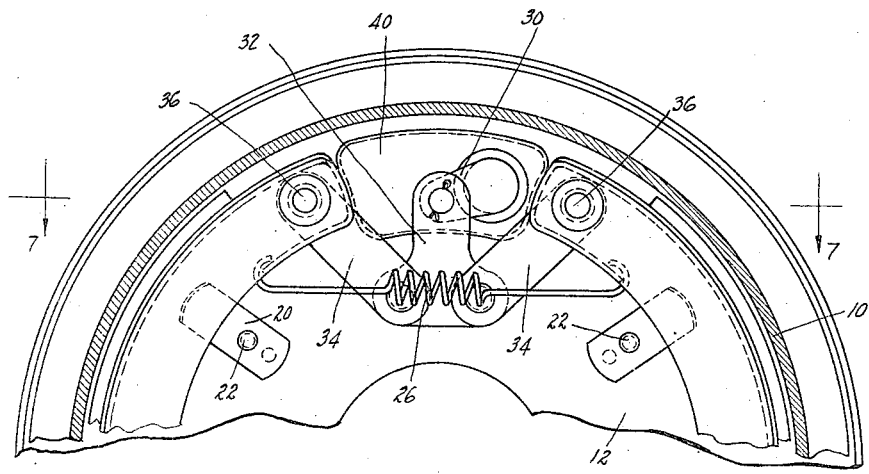
Figure 6 is a section through a portion of another brake, corresponding to the upper part of Figure 1.
Figure 7:
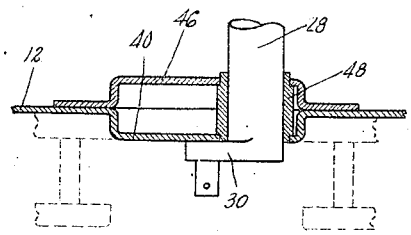
Figure 7 is a partial section, on the line 7—7 of Figure 6, showing the brake anchorage.

As shown in Figures 6 and 7, if preferred a bushing 48 forming the bearing for shaft 28 may be supported by part 40 of the backing plate and by the stamping 46.

When the brake is applied, if the drum 10 is turning clockwise the shoe 14 anchors at its end against the novel abutment 40, while if the drum is turning counter-clockwise the shoe 16 anchors at its end against the abutment 40. Preferably spring 26 is strong enough so that the toggle 34 first lifts the two shoes bodily against the drum while both of them remain in engagement with the anchor abutment, so that the drum friction holds the one or the other of the shoes anchored while the spreading of the toggle completes the application of the brake by forcing the ends of the shoes apart.

The lower ends of the shoes are pivotally connected by a novel floating adjustable joint, preferably including two outwardly cylindrical blocks 44 having plane inner faces inclined with respect to the backing plate 12, so that the blocks form wedges on which the shoes can pivot. The shoes are formed at their ends with transverse cylindrical sockets pivotally engaging the blocks or wedges 44. A spring 46 tensioned between the shoes holds them against the wedges 44. To hold the blocks against endwise movement, they may be provided with ribs or keys 48 seated in slots in the shoe ends.

Wedges 44 have transverse slots embracing ribs or keys 50 on a central adjusting wedge 52 engaged by the head of a transverse adjusting bolt 54 passing between blocks 44. Bolt 54 passes through an enlarged opening in the backing plate, and has an adjusting nut 56 engaging a washer 58 outside the backing plate. Washer 58 transmits the thrust of nut 56 through a spacer 60 to a washer 62 engaging the ends of blocks 44. Thus tightening up on the nut 56 forces blocks 44 apart to adjust the brake for wear.

At the lower side of the drum there is arranged a novel centering lever 64, fulcrumed between its ends on a pivot formed by a bolt or other fastening 66 carried by the backing plate 12, the arrangement being generally similar to that disclosed in my copending application Serial No. 261,068, filed March 12, 1928. Fastening 66 also holds a spring wire 68 engaging the adjusting nut 56 and normally holding it against turning. The left end of lever 64 is urged upwardly by means such as a coil tension spring 70 connected to the lever at its lower end and to the backing plate at its upper end. The right end of lever 64 is formed with a double wedge surface riding on the upper side of the spacer 60.

Lever 64 has two functions. First, it centers bolt 54, and therefore the shoe assembly, in a direction perpendicular to the drum diameter passing through the above-described floating adjustable joint. Second, it urges the shoe assembly downwardly bodily toward the drum. As the arm 32 has a fixed released position, determined by the mechanism (not shown) for operating the shaft 28, this places the entire shoe assembly under spring-loaded tension between arm 32 and lever 64.

In the arrangement of Figures 8 and 9, the brake is applied by a shaft 128 at one side of the brake, which shaft has a relatively long operating arm 130 with a thrust link 132 connected by toggle links 134 to the shoe ends. The shoes in this case anchor on one or the other of two fixed anchor posts 140 carried by the backing plate and passing through openings in the side flanges of the shoes.

The adjustment in this case is made by tightening up on a shouldered nut 156 threaded on the bolt 54 and locked by a locknut 80, the nut 156 directly seating against the washer 62. In this case, a centering lever 164 is pivoted at its end on the nut 156, and has double wedge surfaces slidably wedging and fulcruming against the lower side of a fixed pivot or bolt 166 carried by the backing plate. The action is substantially the same as with lever 64. To avoid undue friction against the backing plate, shoe 14 is shown resting at one side against the head of pivot 166, and both shoes may be formed with projections 82 slidably resting against the backing plate.

Shoes 114 and 116 in the embodiment of Figures 8 and 9 each consist of a single deep curved channel with its bottom toward the backing plate, and with the outer side flange carrying the brake lining.

Figure 10:
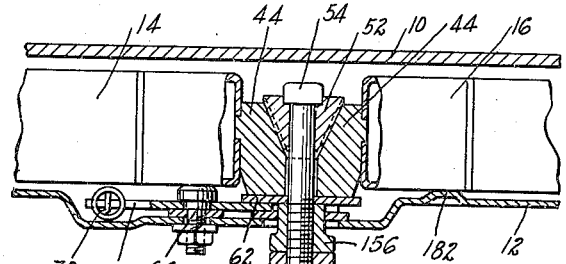
Figure 10 is a section corresponding to part of Figure 9, but showing a modified construction.

In the arrangement of Figure 10, the arrangement as to the adjusting nut 156 is the same as in Figures 8 and 9, but the centering lever 64 is the same as in Figures 1–5. In this case the backing plate is formed with projections 182 slidably engaging the sides of the shoes.

Figures 11 and 13 differ from Figures 8 and 9, in that there is a centering lever 264, mounted on the fixed pivot 166 and riding on the top surface of the adjusting nut 156, and urging the nut downwardly against a stop formed by the upper edge of a stamped plate 84 held by the pivot 166 at one end, and adjustably secured to the backing plate at its other end by a bolt 86 passing through a slot in the backing plate.

In Figures 12 and 14, a centering lever 364 is mounted on a fixed pivot 366 at its right end, has between its ends the double wedge surfaces embracing the lower side of the adjusting nut 156, and is connected to the spring 70 at its left end. This lever urges nut 156 upwardly against a stamping 184 held by the pivot 366 and an adjustable bolt 186 passing through a slot in the backing plate.

While several illustrative embodiments have been described in detail, it is not my intention to limit the scope of the invention to those particular embodiments or otherwise than by the terms of the appended claims.

I claim:

1. A brake comprising, in combination, a drum, friction means within the drum and having one part which anchors when the drum is turning in one direction and a different part which anchors when the drum is turning in the other direction, and a pressed sheet-metal backing plate closing the open side of the drum and having a displaced portion projecting inside of the drum and directly taking the torque from said parts.

2. A brake comprising, in combination, a drum, friction means within the drum and a pressed steel backing plate closing the open side of the drum and having an embossed portion projecting inside the drum and taking the braking torque of the friction means.

3. A brake comprising, in combination, a pair of channel-shaped shoes having transverse pivots carried by their sides adjacent their ends, an operating lever adjacent said ends and having a tension link at its end, and two pairs of thrust links pivotally connected to said tension link to form a toggle and extending into the channels of the shoes and mounted on said transverse pivots, together with a coil spring sleeved on each transverse pivot between the links of the corresponding pair.

4. A brake comprising, in combination, friction means having an adjustment for wear, a centering device adjacent the adjustment, and a member held by the centering device and holding the adjustment against loosening.

5. A channel-shaped brake shoe having a transverse pivot connecting its sides adjacent one end, links sleeved thereon and a resilient member between the links.

6. A channel-shaped brake shoe having a transverse pivot connecting its sides adjacent one end, links sleeved on the pivot and a coil spring on the pivot between the links.

7. A brake comprising a fixed support, a channel-shaped shoe on the support having a transverse pivot adjacent one end and a raised portion on the fixed support adapted to take the torque of the shoe, an operating lever positioned in the raised portion, a tension link on the lever and a pair of thrust links pivotally connecting the tension link to the pivot carried by the shoe.

8. A brake comprising a fixed support, a pair of channel-shaped shoes arranged end to end on the support, transverse pivots in the separable ends of the shoes, a raised portion on the support between the separable ends of the shoes, an operating member positioned for rotation in the raised portion, a tension link on the operating member and two pairs of thrust links pivotally connected to the tension link and to the pivots in the separable ends of the shoe.

9. A brake comprising, in combination, a drum, a floating friction device having separable ends at one side of the drum whose positions are yieldingly determined when the brake is released, and means at the side of the drum opposite said ends resiliently urging the friction device bodily toward the part of the drum opposite said ends.

10. A brake comprising, in combination, a drum, a floating friction device having separable ends at one side of the drum whose positions are yieldingly determined when the brake is released, and means at the side of the drum opposite said ends resiliently urging the friction device bodily toward the part of the drum opposite said ends and also resiliently centering the friction device with respect to the drum at right angles to the drum diameter through said means.

11. A brake comprising, in combination, a drum, a floating assembly of pivotally-connected shoes having separable ends at one side of the drum whose positions are yieldingly determined when the brake is released, and means at the side of the drum opposite said ends resiliently urging the assembly bodily toward the part of the drum opposite said ends.

12. A brake comprising, in combination, a drum, a floating friction device having separable ends at one side of the drum whose positions are yieldingly determined when the brake is released, and a spring urging the friction device bodily toward the part of the drum opposite said ends.

13. A brake comprising, in combination, a drum, a floating friction device having separable ends at one side of the drum whose positions are yieldingly determined when the brake is released, and a lever urging the friction device bodily toward the part of the drum opposite said ends.

14. A brake comprising, in combination, a drum, a floating friction device having separable ends at one side of the drum whose positions are yieldingly determined when the brake is released, and a lever urging the friction device bodily toward the part of the drum opposite said ends and having a wedging action tending to center the friction device with respect to the drum.

15. A brake comprising, in combination, a friction device including a floating pivot, an adjacent stationary part, and a centering lever mounted on said pivot and having wedging engagement with said part.

LUDGER E. LA BRIE.